United States Patent
Tanada et al.

(10) Patent No.: US 7,139,333 B2
(45) Date of Patent: Nov. 21, 2006

(54) FREQUENCY ERROR ESTIMATING RECEIVER, AND FREQUENCY ERROR ESTIMATING METHOD

(75) Inventors: Kazuo Tanada, Tokyo (JP); Hiroshi Kubo, Tokyo (JP); Takeshi Uraguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 792 days.

(21) Appl. No.: 10/275,290

(22) PCT Filed: Mar. 14, 2002

(86) PCT No.: PCT/JP02/02443

§ 371 (c)(1),
(2), (4) Date: Nov. 14, 2002

(87) PCT Pub. No.: WO02/082758

PCT Pub. Date: Oct. 17, 2002

(65) Prior Publication Data

US 2003/0103588 A1    Jun. 5, 2003

(30) Foreign Application Priority Data

Mar. 22, 2001 (JP) ............................. 2001-82910

(51) Int. Cl.
*H03K 9/00* (2006.01)
*H04L 27/06* (2006.01)
*H04L 27/14* (2006.01)
*H04L 27/16* (2006.01)
*H04L 7/00* (2006.01)

(52) U.S. Cl. ............... 375/316; 375/324; 375/365; 375/344

(58) Field of Classification Search ............... 370/252, 370/281, 295, 343, 430, 480, 509, 513; 375/324, 375/340, 344, 316, 371; 329/316, 315
See application file for complete search history.

(56) References Cited

U.S. PATENT DOCUMENTS

| | | | |
|---|---|---|---|
| 5,093,848 A * | 3/1992 | Raith | 375/344 |
| 5,912,931 A * | 6/1999 | Matsumoto et al. | 375/340 |
| 6,289,041 B1 * | 9/2001 | Krasner | 375/152 |
| 6,519,300 B1 * | 2/2003 | Ramesh | 375/344 |
| 6,563,859 B1 * | 5/2003 | Oishi et al. | 375/148 |
| 6,693,882 B1 * | 2/2004 | Gu et al. | 370/252 |
| 2005/0074077 A1 * | 4/2005 | Sugiura | 375/340 |

FOREIGN PATENT DOCUMENTS

| | | |
|---|---|---|
| JP | 04-142847 | 5/1992 |
| JP | 06-216959 | 8/1994 |
| JP | 2000-69102 | 3/2002 |

OTHER PUBLICATIONS

H. Kubo: "Adaptive maximum-likelihood sequence estimation by means of combined equalization and decording in fading environments" IEEE Journal on Selected Areas in Communications, vol. 13, No. 1, pp. 102-109, Jan. 1995.

Hirotsugu Kubo et al.: "Jotai mai densoro suitei niyoru tekiokei saiyu keiretsu suitei o mochiita blind fukucho hoshiki" The Institute of Electronics, Information and Communication Engineers Gijutsu Kenkyu Hokoku RCS 99-180-193, vol. 99, No. 569, pp. 37-44, Jan. 2000.

Hiroshi Kubo et al.: "A parallel blind demodulator in the presence of intersymbol interference" The Institute of Electronics, Information and Communication Engineers, Technical, Report of IEICE, DPS99-180, SAT99-135, RCS99-185, pp. 2520-2524, 2001.

S.N. Crozier et al.: "Performance of a simple delay-multiply-average technique for frequency estimation" Canadian Conference on Electrical and Computer Engineering, paper WM10.3.1-WM10. 3.5, 1992.

* cited by examiner

*Primary Examiner*—Kevin Kim
*Assistant Examiner*—Linda Wong
(74) *Attorney, Agent, or Firm*—Oblon, Spivak, McClelland, Maier & Neustadt, P.C.

(57) ABSTRACT

A sampling unit that sequentially samples a received signal. A plurality of demodulation processing units set in advance with frequency correction values of mutually different sizes, and that correct frequencies of the sampled signals according to the frequency correction values, demodulate the sampled signals after the frequency correction, and output decision values and reliability information of the received signal, and detect known synchronization words that have been inserted into the received signal from the decision value. A decision value selecting unit selects one final decision value from a plurality of decision values based on a plurality of pieces of reliability information that have been output from the demodulation processing units and a result of the detection of the synchronization word. And, a frequency error detecting unit estimates a frequency error of the received signal based on a frequency correction value of the demodulation processing unit corresponding to the final decision value.

10 Claims, 8 Drawing Sheets

FREQUENCY ERROR ESTIMATING RECEIVER, AND FREQUENCY ERROR ESTIMATING METHOD

TECHNICAL FIELD

The present invention relates to a receiver that is used for satellite communications or mobile communications. The invention particularly relates to a receiver that estimates a frequency error that occurs between a frequency of a local oscillator of the receiver and a frequency of a carrier for a received signal, and a method of estimating a frequency error.

BACKGROUND ART

FIG. 10 is a block diagram of a conventional frequency error estimating circuit that is shown in, for example, "Performance of a Simple Delay-Multiply-Average Technique for Frequency Estimation", S. N. Crozier, et al., Canadian Conference on Electrical and Computer Engineering, paper WM10.3, Sep. 13–16, 1992. In FIG. 10, 1 denotes a received signal, 2 denotes a sampling section that samples the received signal 1 at a symbol rate, 101 denotes a multiplier that multiplies a sampled received signal 3 and removes a modulation component from the signal, 102 denotes a delay detector that sequentially detects delay of an output of the multiplier 101, 103 denotes an averaging filter that averages an output of the delay detector 102 and suppresses a noise component, 104 denotes a coordinate converter that calculates a phase component of a received signal based on an output of the averaging filter 103, and 105 denotes a divider that calculates a frequency error from the phase component of the received signal.

The operation of the conventional frequency error estimating circuit will be explained below. The received signal 1 has been modulated according to an M-phase PSK (Phase Shift Keying) modulation system, and is prescribed by the following expression 1.

$$r(t)=A(t)exp[j\{\theta(t)+\Delta\omega t\}] \quad (1)$$

where r(t) represents the received signal 1, A(t) represents an amplitude component, and θ(t) represents a modulation phase component. The phase component of the received signal includes a frequency error Δωt. In order to simplify the explanation, it is assumed that the received signal 1 does not contain a noise component.

The sampling section 2 sequentially samples the received signal 1 at a symbol rate. The received signal 3 after being sampled is expressed by the following expression 2.

$$r(nT)=A(nT)exp[j\{\theta(nT)+\Delta\omega nT\}] \quad (2)$$

where r(nT) represents the sampled received signal 3, T represents a symbol period, and n represents a natural number. A modulation phase component θ(nT) becomes as follows according to the M-phase PSK modulation system.

$$\theta(nT)=2\pi k/M \quad (3)$$

k=0, 1, . . . , M−1)

The modulation phase component θ(nT) takes M values in total at equal intervals within a range of 0 to 2π.

The multiplier 101 multiplies the received signal 3 by a predetermined modulation multiple-value M to remove the modulation phase component from the received signal 3. A signal $r_1(nT)$ after the multiplication is expressed by the following expression 4.

$$r_1(nT)=A(nT)exp[jM\{\theta(nT)+\Delta\omega nT\}] \quad (4)$$

It is clear that a modulation phase component Mθ(nT) after the M multiplication is an integral multiple of 2π from the above expression 3, and it is possible to disregard this component. In other words, the signal $r_1(nT)$ after the multiplication is expressed by the following expression 5.

$$r_1(nT)=A(nT)exp(jM\Delta\omega nT) \quad (5)$$

The delay detector 102 detects delay of the M-multiplied signal $r_1(nT)$ for a predetermined symbol period. When a symbol period in the processing of delay detection is D, a demodulated signal $d_1(nT)$ after the delay detection becomes as follows.

$$d_1(nT) = r_1(nT)r_1*(nT - DT)$$
$$= A(nT)A(nT - DT)exp(jMD\Delta\omega T)$$

where $r_1*(nT-DT)$ represents a conjugate complex of $r_1(nT-DT)$.

Assume that a Nyquist point has been selected as a sampling timing in the sampling section 2. As an amplitude component A(nT) of the received signal is always constant, the demodulated signal $d_1(nT)$ is expressed by the following expression 6.

$$d_1(nT)=exp(jMD\Delta\omega T) \quad (6)$$

The averaging filter 103 averages the demodulated signal $d_1(nT)$, after the delay detection, over a predetermined period of time, thereby to suppress a noise component contained in the received signal. As it is assumed here that a noise component is not contained in the received signal, the demodulated signal $d_1(nT)$ is output from the averaging filter 103 as it is.

The coordinate converter 104 converts the coordinates of the demodulated signal $d_1(nT)$ that are expressed in an orthogonal coordinate system on the phase plane into coordinates expressed in polar coordinates, and calculates a phase component MDΔωT of the demodulated signal $d_1(nT)$. Last, the divider 105 divides the phase component MDΔωT of the demodulated signal by MD, and outputs the frequency error ΔωT of the received signal over one symbol period T. An estimate range Δf (=Δω/2π) of the frequency error is expressed by the following expression 7.

$$|\Delta f| < f_s/2MD \quad (7)$$

where $f_s$ represents a symbol rate of the received signal.

Therefore, for example, when the number of symbol periods of the delay detection processing is D=1 in the QPSK modulation system (multiple number to be modulated M=4), it is possible to estimate frequency error up to ⅛ of the symbol rate $f_s$. The frequency error thus estimated is used to control a local oscillator of a receiver like a VCO (Voltage Controlled Oscillator).

According to the conventional frequency error estimating circuit, it is necessary to make the symbol period D of the delay detector 103 as small as possible, in order to widen the estimate range Δf of the frequency error. However, when a local oscillator with low setting precision of frequency is used in the mobile communications of a low symbol rate, or when the received signal undergoes large Doppler shift like in the mobile satellite communications, the frequency error of the local oscillator with respect to the received signal might become larger than the estimate range Δf of the frequency error estimating circuit prescribed by the expression 7. Consequently, there has been a problem that it is not possible to accurately estimate the frequency error.

On the other hand, in order to estimate a large frequency error in the conventional frequency error estimating circuit, there has been a method of expanding the estimate range Δf of the frequency error by M times without performance of the multiplication processing of a received signal by the multiplier 101. According to this method, it is necessary to transmit known patterns for estimate of a frequency error separately from the normal data, in order to estimate the frequency error. Therefore, there has been a problem that the data transmission efficiency is lowered substantially.

Further, it is not possible to estimate a frequency error during reception of the normal data. Therefore, there has been a problem that it is not possible to accurately correct the frequency error and the communication quality is degraded when there is a large variation in the frequency error due to a move of the receiver during communications.

Therefore, the present invention has an object of providing a receiver and a frequency error estimating method capable of accurately estimating a frequency error without lowering the data transmission efficiency, even when a large frequency error occurs between a received signal and a local oscillator of the receiver.

DISCLOSURE OF THE INVENTION

The receiver according to the present invention comprises a sampling unit that sequentially samples a received signal modulated using a predetermined system; a plurality of demodulation processing units that have frequency correction values of mutually different sizes set in advance, and that correct frequencies of the sampled signals according to the frequency correction values, discretely demodulate the sampled signals after the frequency correction, output decision values and reliability information of the received signal, and detect each known synchronization word inserted into the received signal from the decision values; a decision value selecting unit that selects one final decision value from a plurality of decision values based on a plurality of pieces of reliability information and results of the detection of the synchronization words that have been output from the demodulation processing units; and a frequency error detecting unit that estimates a frequency error of the received signal based on a frequency correction value of the demodulation processing unit corresponding to the final decision value.

In the receiver according to the next invention, the sampling unit over-samples the received signal for each symbol at a plurality of sampling timings and sequentially outputs sampled signals. The receiver further comprises a distributing unit that sequentially distributes the sampled signals at the sampling timings, and outputs a plurality of distributed signals. The distributed signals are demodulated by the plurality of demodulation processing units that have the frequency correction values of mutually different sizes.

The receiver according to the next invention comprises a sampling unit that sequentially samples a received signal modulated using a predetermined system; a storing unit that sequentially stores the sampled signals over a predetermined period of time; a demodulation processing unit that sequentially corrects the frequencies of the sampled signals stored in the storing unit according to a predetermined frequency correction value, demodulates the sampled signals after the frequency correction, outputs decision values and reliability information of the sampled signals, and detects a known synchronization word that has been inserted into the received signal, from the decision values; a demodulation control unit that makes the demodulation processing unit demodulate the sampled signals in the storing unit repeatedly by a plurality of times, while the frequency correction values obtained in the demodulation processing unit are changed to one another; a decision value storing unit that stores a decision value, reliability information, and a result of the detection of the synchronization word relating to each of the frequency correction values, respectively; a decision value selecting unit that selects one final decision value from the plurality of decision values based on a plurality of pieces of reliability information and results of the detection of the synchronization words that have been stored in the decision value storing unit; and a frequency error detecting unit that estimates a frequency error of the received signal based on a frequency correction value corresponding to the final decision value.

In the receiver according to the next invention, the demodulation processing unit carries out detection processing of a synchronization word corresponding to a decision value based on a plurality of known patterns obtained by phase-shifting a known synchronization pattern with a plurality of different phase shift quantities respectively, and specifies a phase shift quantity of a known pattern in which the synchronization word has been detected. The frequency error detecting unit corrects the frequency correction value corresponding to the final decision value that has been selected by the decision value selecting unit, with the specified phase shift quantity, and estimates a frequency error of the received signal.

The receiver according to the next invention further comprises a synchronization detecting unit that decides whether the receiver is in a synchronous state, based on the result of the detection of the synchronization word corresponding to the final decision value. The demodulation processing unit selects any of the frequency correction values according to a result of the decision made on the synchronous state.

A frequency error estimating method according to the next invention comprises a sampling step of sequentially sampling a received signal modulated using a predetermined system; a plurality of demodulation processing steps of setting in advance frequency correction values of mutually different sizes, correcting frequencies of the sampled signals according to the frequency correction values, discretely demodulating the sampled signals after the frequency correction, outputting decision values and reliability information of the received signal, and detecting known synchronization words that have been inserted into the received signal, from the decision value; a decision value selecting step of selecting one final decision value from a plurality of decision values based on a plurality of pieces of reliability information and results of the detection of the synchronization word output at the demodulation processing steps; and a frequency error detecting step of estimating a frequency error of the received signal based on a frequency correction value at the demodulation processing step corresponding to the final decision value.

In the frequency error estimating method according to the next invention, the sampling step includes over-sampling the received signal for each symbol at a plurality of sampling timings and sequentially outputting sampled signals. The method further comprising a distributing step of sequentially distributing the sampled signals at the sampling timings, and outputting a plurality of distributed signals. The distributed signals are demodulated at the plurality of demodulation processing steps in which the frequency correction values of mutually different sizes are used.

The frequency error estimating method according to the next invention comprises a sampling step of sequentially sampling a received signal modulated using a predetermined system; a storing step of sequentially storing the sampled signals over a predetermined period of time; a demodulation processing step of correcting frequencies of the sampled signals stored at the storing step by a predetermined frequency correction value, demodulating the sampled signals after the frequency correction, outputting decision values and reliability information of the sampled signals, and detecting a known synchronization word that has been inserted into the received signal, from the decision values; a demodulation control step of controlling so as to execute processing in the demodulation processing step repeatedly by a plurality of times, while the frequency correction values are changed to one another; a decision value storing step of storing a decision value, reliability information, and a result of the detection of the synchronization word relating to each of the frequency correction values, respectively; a decision value selecting step of selecting one final decision value from a plurality of decision values based on a plurality of pieces of reliability information and a result of the detection of the synchronization word that have been stored at the decision value storing step; and a frequency error detecting step of estimating a frequency error of the received signal based on a frequency correction value corresponding to the final decision value.

In the frequency error estimating method according to the next invention, the demodulation processing steps includes carrying out a detection processing of a synchronization word corresponding to a decision value based on a plurality of known patterns obtained by phase-shifting a known synchronization pattern with a plurality of different phase shift quantities respectively, and specifying a phase shift quantity of a known pattern in which the synchronization word has been detected. The frequency error detecting step includes correcting the frequency correction value corresponding to the final decision value selected at the decision value selecting step, with the specified phase shift quantity, and estimating a frequency error of the received signal.

The frequency error estimating method according to the next invention further comprises a synchronization detecting step of deciding whether the receiver is in a synchronous state, based on a result of the detection of a synchronization word corresponding to the final decision value. The demodulation processing step includes selecting any of the frequency correction values according to a result of the decision made on the synchronous state.

BEST MODE FOR CARRYING OUT THE INVENTION

First Embodiment

Figure 1:
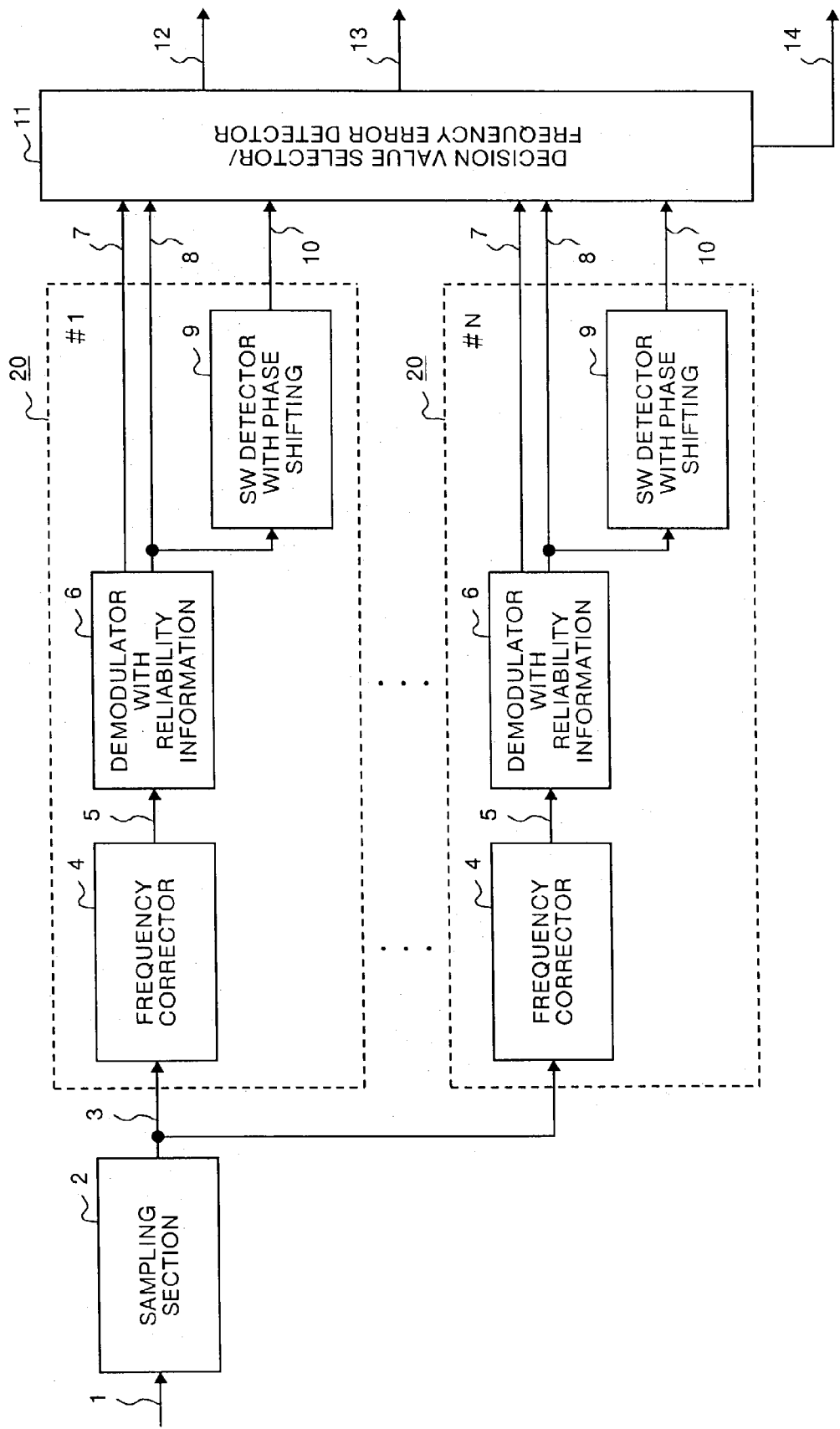
FIG. 1 is a block diagram of a receiver according to a first embodiment of the present invention.

FIG. 1 is a block diagram of a receiver according to the first embodiment of the present invention. In FIG. 1, 1 denotes a received signal, 2 denotes a sampling section that sequentially samples the received signal at a symbol rate, 3 denotes a sampled signal, and 20 denotes a demodulation processor that individually demodulates the sampled signals. The demodulation processor 20 is provided by a plurality of number.

In each demodulation processor 20, 4 denotes a frequency corrector that corrects the frequency of the sampled signal 3 based on a frequency correction value that is set in advance, 5 denotes a frequency-corrected sampled signal, 6 denotes a demodulator having reliability information that demodulates the frequency-corrected sampled signal 5, and outputs a hard decision value 8 as a result of the demodulation of the received signal and reliability information 7 thereof, and 9 denotes an SW detector having phase shift that detects a known synchronization word (SW) that has been inserted into the received signal, from the hard decision value 8, and outputs a detection result 10 of the synchronization word. In the first embodiment, N (#1 to #N) demodulation processing units are provided in an actual case, and the reliability information 7, the hard decision value 8, and the synchronization word detection result 10 are output from each demodulation processing unit. However, for the purpose of simplicity, only two demodulation processing units 20 (#1, #N) are shown in FIG. 1.

Further, 11 denotes a decision value selector/frequency error detector that selects one final decision value 12 from N hard decision values 8 in total based on the reliability information 7 and the synchronization word detection result 10 that have been output from each demodulation processor 20, outputs a synchronization word detection result 13 corresponding to the value, and detects an estimate frequency error 14 corresponding to a received signal of a local oscillator of the receiver.

The operation of the receiver according to the first embodiment that has the above structure will be explained below. It is assumed that the received signal 1 has a frame structure of a predetermined data length and is inserted with a known synchronization word for each frame, and synchronization between a transmitter and a receiver can be established by detecting the synchronization word of each frame in the receiver. Further, in order to simplify the explanation of the first embodiment, it is assumed that the received signal 1 is modulated by a differential coding QPSK system.

First, the sampling section 2 samples the received signal 1 at a symbol rate T that has been modulated by the differential coding QPSK system, and outputs the sampled signal 3 that is expressed by the above expression 2 to each of the total N demodulation processors 20. The sampled signal 3 includes the frequency error component $\Delta\omega T$ to be estimated. In order to remove the frequency error component $\Delta\omega T$ from the sampled signal 3, the sampled signal 3 may be multiplied by a phase rotation component $\exp(-j\Delta\omega nT)$ However, as the size of the frequency error component $\Delta\omega T$ is unknown, it is not possible to determine a suitable phase rotation component in advance.

Therefore, in the first embodiment, frequency correction values $\Delta\phi_i$ (i=1, 2, ..., N) that are mutually different are set to the frequency correctors 4 of the total N demodulation processors 20, and the frequency correction processing of the sampled signals 3 is carried out individually according to the frequency correction values $\Delta\phi_i$.

When a maximum value of the frequency error to be estimated in advance by the receiver is $\Delta\omega_{max}$, a permissible range of the frequency errors $\Delta\omega T$ to be estimated is given from the following expression 8.

$$|\Delta\omega T| < \Delta\omega_{max} \qquad (8)$$

In order that the total N frequency correctors 4 uniformly contain the frequency errors $\Delta\omega T$ of the above range, the frequency correction value $\Delta\phi_i$ of each frequency corrector 4 is prescribed by the following expression 9.

$$\Delta\phi_i = -\Delta\omega_{max} + \frac{2\Delta\omega_{max}}{N} \times (i-1) \qquad (9)$$

Each frequency corrector 4 multiplies the sampled signal 3 by a phase rotation component $\exp(-j\Delta\phi_i n)$ that is prescribed by the frequency correction value $\Delta\phi_i$, and outputs a frequency-corrected sampled signal 5 to the demodulator 6 with reliability information.

Each demodulator 6 with reliability information demodulates the frequency-corrected sampled signal 5. In the first embodiment, it is assumed that a delay time of a delay wave that is added to the received signal 1 in a propagation path is sufficiently small as compared with the symbol period T and that the influence of the delay wave can be disregarded. Based on the above assumption, a case when a delay detecting system is employed as a demodulation system will be explained.

Figure 2:
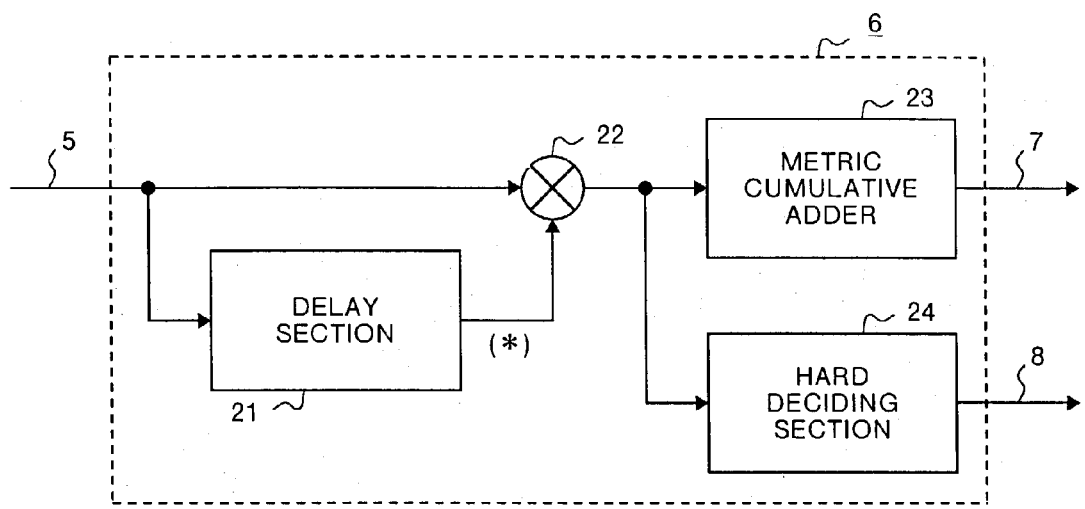
FIG. 2 is a block diagram of a demodulator having reliability information based on a delay detecting system according to the first embodiment of the present invention.

FIG. 2 is a block diagram of the demodulator 6 with reliability information according to the delay detecting system. In FIG. 2, 21 denotes a delay section that delays the frequency-corrected sampled signal 5 by one symbol period T, 22 denotes a multiplier that complex-multiplies the sampled signal 5 and the conjugate complex of the output signal of the delay section 21, 23 denotes a metric cumulative adder that cumulatively adds a square error between the result of complex multiplication and an ideal modulation signal point, and outputs the reliability information 7, and 24 denotes a hard deciding section that prepares the hard decision value 8 from the complex multiplication result.

The operation of the demodulator 6 with reliability information that has the above structure will be explained below. First, the multiplier 22 complex-multiplies the frequency-corrected sampled signal 5 and the conjugate complex of the output of the delay section 21, and outputs a delay detection result. Next, the hard deciding section 24 selects a modulation signal point that is closest to the delay detection result out of four modulation signal points of the QPSK system on the complex plane, and outputs this as the hard decision value 8.

The metric cumulative adder 23 calculates a square Euclidean distance, as a metric, between the modulation signal point that has been selected as the hard decision value 8 and the delay detection result. Next, the metric cumulative adder 23 sequentially cumulatively adds the metric for a predetermined number of symbols, and outputs the metric cumulative value as the reliability information 7 indicating the degree of reliability (accuracy) of the hard decision value 8.

As a result of the demodulation processing, each of the total N demodulation processors 20 outputs the hard decision value 8 and the reliability information 7. As the frequency of the sampled signal 3 to be demodulated has been corrected by each separate frequency correction value $\Delta\phi_i$ in each demodulation processor 20, the reliability information 7 of each demodulation processor 20 is different from that of the others in terms of a reliability level. In other words, the reliability information 7 of the demodulation processor, in which the frequency correction value $\Delta\phi_i$ closest to the frequency errors $\Delta\omega T$ to be estimated is set, has the highest reliability (a metric cumulative value is minimum). Consequently, the reliability information 7 of the demodulation processor that has a large difference between the frequency errors $\Delta\omega T$ and the frequency correction value $\Delta\phi_i$ has low reliability (a metric cumulative value is increased).

On the other hand, when the range of frequency errors to be detected is large and the following relationship is obtained, $$\Delta\omega_{max} \geq \pi/4$$

the reliability information 7 may have high reliability even if the difference between the frequency error $\Delta\omega T$ and the frequency correction value $\Delta\phi_i$ is large.

For example, when the following relationship is established between the frequency correction value $\Delta\phi_i$ of the frequency corrector and the frequency error $\Delta\omega T$, $$\Delta\phi_i = \Delta\omega T - \pi/2 \qquad (10)$$

the frequency-corrected sampled signal 5 $(=r_1(nT))$ is expressed by the following expression 11.

$$r_1(nT) = A(nT)\exp[j\{\theta(nT) + (\Delta\omega nT - \Delta\varphi_i n)\}] \qquad (11)$$
$$= A(nT)\exp[j\{\theta(nT) + n\pi/2\}]$$

As shown by the expression 11, a phase rotation component $n\pi/2$ remains in addition to a modulation phase component $\theta(nT)$ in the frequency-corrected sampled signal 5. In this instance, when the hard deciding section 24 carries out a hard decision processing, a modulation signal point that is different from the originally received data is selected as the hard decision value 8 because of the influence of the phase rotation component $n\pi/2$. As a result, an accurate hard decision value 8 is not obtained. The phase rotation component $n\pi/2$ that remains in the sampled signal 5 of the frequency error will hereinafter be referred to as an "erroneously decided phase component".

However, according to the QPSK system, each modulation signal point is disposed at an equal phase interval of $\pi/2$ on the complex plane. Therefore, when the erroneously decided phase component remains as shown in the above expression 11, the signal after the demodulation becomes close to an erroneous modulation signal point other than the modulation signal point that should originally be decided, and the metric becomes small. In this case, the corresponding reliability information 7 becomes highly reliable, although the accurate hard decision value 8 has not been actually obtained. Therefore, it is not possible to specify the frequency correction value $\Delta\phi_i$ that is closest to the frequency error $\Delta\omega T$, based on only the reliability information 7.

Therefore, in the first embodiment, the SW detector 9 with phase shifting detects the known synchronization word (an SW pattern) that has been inserted into the received signal 1 in advance, from the hard decision value 8, and specifies the size of the erroneously decided phase component based on the detection result.

Figure 3:
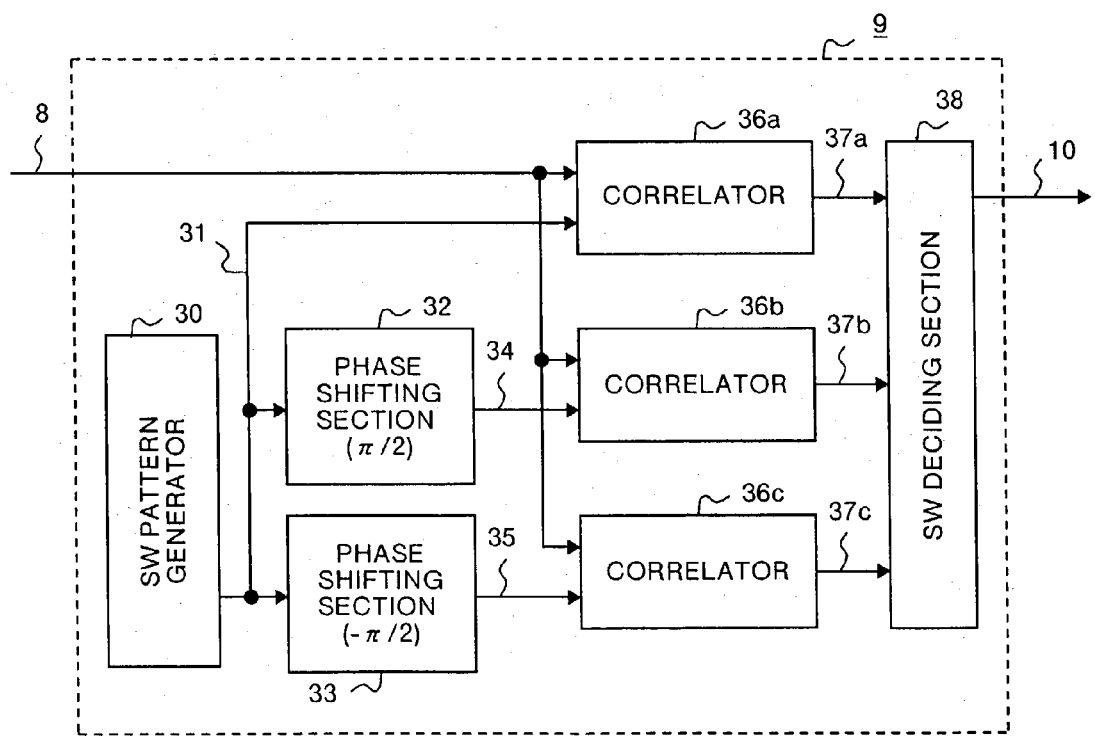
FIG. 3 is a block diagram of an SW detector having phase shift according to the first embodiment of the present invention.

FIG. 3 is a block diagram of the SW detector 9 with phase shifting. In FIG. 3, 30 denotes an SW pattern generator that generates a known SW pattern 31. 32 and 33 denote phase shifting sections that shift the SW pattern 31 by $\pi/2$ and $-\pi/2$, respectively. 34 denotes an SW pattern that has been shifted by $\pi/2$ phase, and 35 denotes an SW pattern that has been shifted by $-\pi/2$ phase. 36a, 36b, and 36c denote correlators that calculate correlation values 37a, 37b, and 37c between the hard decision value 8 and each of the SW patterns, respectively. 38 denotes an SW deciding section that decides by which SW pattern of the phase shift quantity the synchronization word has been detected, from the correlation values 37a, 37b, and 37c.

The operation of the SW detector 9 with phase shifting will be explained next. First, the SW pattern generator 30 generates the SW pattern 31 obtained by modulating the synchronization word according to the QPSK modulation system. Next, the phase shifting sections 32 and 33 phase-shift the SW pattern 31 respectively, and output the $\pi/2$ phase-shifted SW pattern 34 and the $-\pi/2$ phase-shifted SW pattern 35, respectively.

The correlator 36a sequentially calculates the correlation value 37a between the hard decision value 8 and the SW pattern 31 that has not been phase-shifted. As a result, when the erroneously decided phase component does not remain in the sampled signal 5 and the accurate decision value 8 is obtained, the correlation value 37a becomes large at the data portion corresponding to the synchronization word in the hard decision value 8. On the other hand, when the erroneously decided phase component remains in the sampled signal 5, the correlation value 37a does not become large even at the data portion corresponding to the synchronization word in the hard decision value 8.

The correlator 36b sequentially calculates the correlation value 37b between the hard decision value 8 and the SW pattern 34 that has been phase-shifted by $\pi/2$. As a result, when the erroneously decided phase component remains in the sampled signal 5 by $\pi/2$, the correlation value 37b becomes large, but when the erroneously decided phase component is other than $\pi/2$, the correlation value 37b does not become large.

Similarly, the correlator 36c sequentially calculates the correlation value 37c between the hard decision value 8 and the SW pattern 35 that has been phase-shifted by $-\pi/2$. As a result, when the erroneously decided phase component remains in the sampled signal 5 by $-\pi/2$, the correlation value 37c becomes large, but when the erroneously decided phase component is other than $-\pi/2$, the correlation value 37c does not become large.

Threshold values of correlation values are stored in the SW deciding section 38 in advance, in order to decide the detection of a synchronization word. The SW deciding section 38 compares the correlation values 37a to 37c with the threshold values, and decides that a synchronization word has been detected when the correlation value is larger than the threshold value.

As a result, when detection of the synchronization word has been decided in the correlation value 37a relating to the SW pattern 31 that has not been phase-shifted, it is decided that the erroneously decided phase component does not remain in the hard decision value 8, and that the reliability of the reliability information 7 relating to the hard decision value 8 is accurate. Then, information indicating "synchronization word successfully detected; erroneously decided phase component: 0" is output as the synchronization word detection result 10.

On the other hand, when detection of the synchronization word has been decided in the correlation value 37b relating to the SW pattern 34 that has been phase-shifted by $\pi/2$, it is decided that the erroneously decided phase component $\pi/2$ remains in the hard decision value 8, and that the reliability information 7 is not accurate. Then, information indicating "synchronization word detected, correction value found inappropriate; erroneously decided phase component: $\pi/2$" is output as the synchronization word detection result 10.

When detection of the synchronization word has been decided in the correlation value 37c relating to the SW pattern 35 that has been phase-shifted by $-\pi/2$, it is decided that the erroneously decided phase component $-\pi/2$ remains in the hard decision value 8, and that the reliability information 7 is not accurate. Then, information indicating "synchronization word detected, correction value found inappropriate; erroneously decided phase component: $-\pi/2$" is output as the synchronization word detection result 10.

When detection of a synchronization word has not been decided in any one of the correlation values 37a to 37c, information indicating "synchronization word undetected" is output as the synchronization word detection result 10.

As a result of the processing of synchronization word detection by the SW detector 9 with phase shifting, each of the total N demodulation processors 20 outputs the synchronization word detection result 10.

The decision value selector/frequency error detector 11 receives the reliability information 7, the hard decision value 8, and the synchronization word detection result 10 from each of the total N demodulation processors 20, and carries out the processing of selecting a final decision value and the processing of estimating a frequency error.

Figure 4:
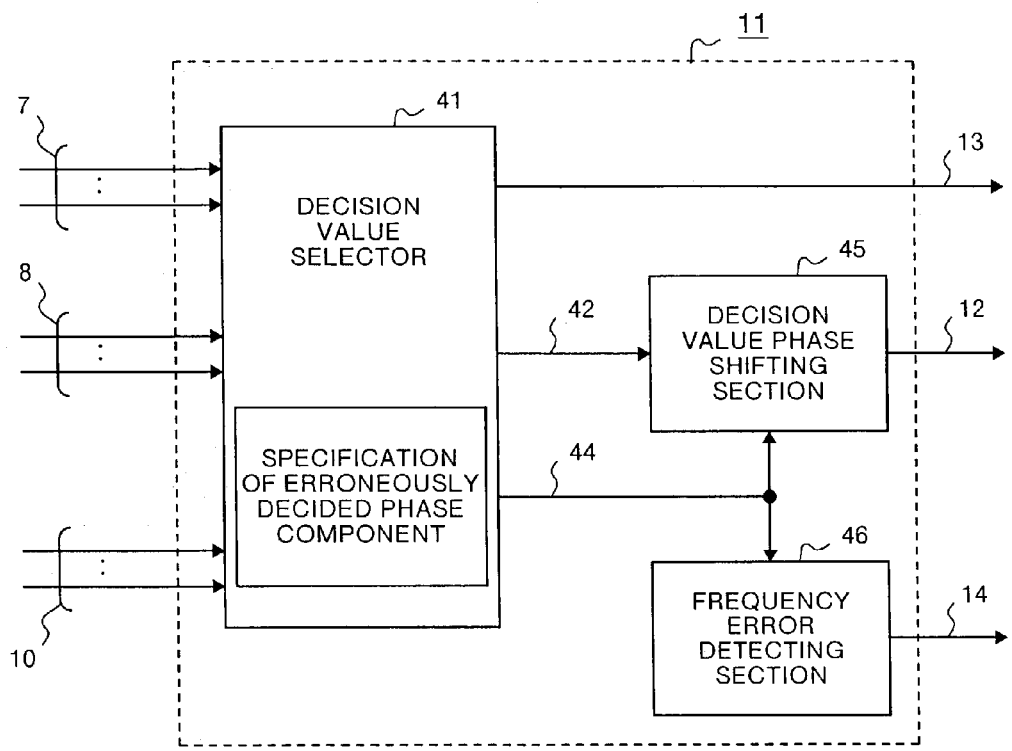
FIG. 4 is a block diagram of a decision value selector/frequency error detector according to the first embodiment of the present invention.

FIG. 4 is a block diagram of the decision value selector/frequency error detector 11. In FIG. 4, 41 denotes a decision value selector that selects a maximum-likelihood decision value 42 that has the highest reliability based on the reliability information 7, 45 denotes a decision value phase shifting section that phase-shifts the maximum-likelihood decision value 42 and outputs a final decision value 12, and 46 denotes a frequency error detector that estimates a frequency error based on the frequency correction value of each demodulation processor 20 and the synchronization word detection result 10.

The operation of the decision value selector/frequency error detector 11 will be explained below. First, the decision value selector 41 extracts all information indicating "synchronization word successfully detected" or "synchronization word detected, correction value found inappropriate" from the total N synchronization word detection results 10. Next, the reliability information 7 with the highest reliability is specified as maximum likelihood reliability from the reliability information 7 corresponding to each extracted synchronization word detection result 10, and the decision value 8 corresponding to the maximum likelihood reliability is output as the maximum-likelihood decision value 42.

The decision value selector 41 specifies the synchronization word detection result 10 corresponding to the maximum likelihood reliability, and specifies an erroneously decided phase component included in the specified synchronization word detection result 10 as an erroneously decided phase component 44 relating to the maximum-likelihood decision value 42. For example, when the synchronization word detection result corresponding to the maximum likelihood reliability is "synchronization word successfully detected; erroneously decided phase component: 0", the erroneously decided phase component 44 of the maximum-likelihood decision value 42 is specified as zero. Further, when the synchronization word detection result corresponding to the maximum likelihood reliability is "synchronization word detected, correction value found inappropriate; erroneously decided phase component: $\pi/2$", the erroneously decided phase component 44 of the maximum-likelihood decision value 42 is specified as $\pi/2$.

The decision value phase shifting section 45 carries out phase shift processing in order to compensate for the erroneously decided phase component 44 from the maximum-likelihood decision value 42. For example, when the erroneously decided phase component 44 is $\pi/2$, the maximum-likelihood decision value 42 is multiplied by a phase rotation component $\exp(-j\pi/2)$. When the erroneously decided phase component 44 is $-\pi/2$, the maximum-likelihood decision value 42 is multiplied by a phase rotation component $\exp(j\pi/2)$ so as to remove the erroneously decided phase component 44. On the other hand, when the erroneously decided phase component 44 is zero, the phase shift processing is not carried out to the maximum-likelihood decision value 42. As a result, the decision value obtained by removing the erroneously decided phase component 44 is output as the final decision value 12.

When all of the input total N synchronization word detection results 10 is "synchronization word undetected", the decision value selector 41 specifies maximum likelihood reliability among all the reliability information 7, and outputs the hard decision value 8 corresponding to the maximum likelihood reliability as the maximum-likelihood decision value 42. In this case, the decision value phase shifting section 45 does not carry out the phase shift processing to the maximum-likelihood decision value 42, but outputs the maximum-likelihood decision value 42 as the final decision value 12 without any change.

The decision value selector 41 outputs the synchronization word detection result 10 corresponding to the maximum likelihood reliability as the synchronization word detection result 13 relating to the final decision value.

The frequency error detector 46 stores in advance the frequency correction values $\Delta\phi_i$ (i=1, 2, ..., N) that have been set respectively to the frequency correctors 4 of the demodulation processors 20. When the decision value selector 41 has specified the maximum likelihood reliability, the frequency error detector 46 specifies the frequency correction value $\Delta\phi_i$ of the demodulation processor 20 corresponding to the maximum likelihood reliability. Next, based on the frequency correction value $\Delta\phi_i$ and the erroneously decided phase component 44, the estimate frequency error 14 between the local oscillator of the receiver and the received signal 1 is estimated, and is output. The estimate frequency error 14 is obtained from the following expression 12.

$$\Delta\omega e=(\Delta\phi_i+\theta s)/T \qquad (12)$$

where $\Delta\omega e$ represents the estimate frequency error 14, $\theta s$ represents a phase shift quantity in the decision value phase shifting section 45, and T represents a symbol period.

As explained above, according to the first embodiment, a plurality of demodulation processors 20 are provided. Each demodulation processor 20 carries out a frequency correction of the sampled signal 3 based on the frequency correction value $\Delta\phi_i$ that is different from each other, and carries out each separate demodulation processing. The final decision value 12 with the highest reliability is specified from among a plurality of hard decision values 8 that have been obtained as a result. Based on the frequency correction value $\Delta\phi_i$ corresponding to the final decision value 12, the estimate frequency error 14 of the received signal 1 is detected. Therefore, by determining the frequency correction value $\Delta\phi_i$ of each demodulation processor 20 based on the maximum value $\Delta\omega_{max}$ of the frequency error to be estimated that has been set in advance, it becomes possible to accurately detect the estimate frequency error 14 within the estimate range of the frequency errors.

A plurality of SW patterns obtained by phase-shifting a synchronization word are generated according to the modulation system, and the estimate frequency error 14 is corrected by considering the synchronization word detection results according to the SW patterns. Based on this, it is possible to improve the estimate precision of frequency errors.

As the estimate frequency error 14 is detected by using only the known synchronization word that has been inserted into the received signal 1 to establish the synchronization of the transmission data, it is not necessary to insert a specific pattern to estimate the frequency error into the transmission data. It is possible to correct the frequency error without lowering the data transmission efficiency, and it is also possible to accurately estimate the frequency error even when the frequency error varies during communications in the mobile communication system or the like.

In the first embodiment, while the case where the differential coding QPSK system is employed as the modulation system has been explained, the modulation system is not limited to this, and it is also possible to obtain a similar effect from other modulation systems.

In the first embodiment, the case where the delay detecting system is employed as a demodulating system of the demodulator 6 with reliability information by assuming that the delay time of a delay wave added to the received signal 1 is sufficiently small as compared with the symbol period T and that the influence of the delay wave can be disregarded, has been explained. However, the demodulating system is not limited to this structure. For example, when the delay time of the delay wave is unignorably large in comparison with the symbol period T, an adaptive equalizer may be employed as the demodulator 6 with reliability information.

Figure 5:
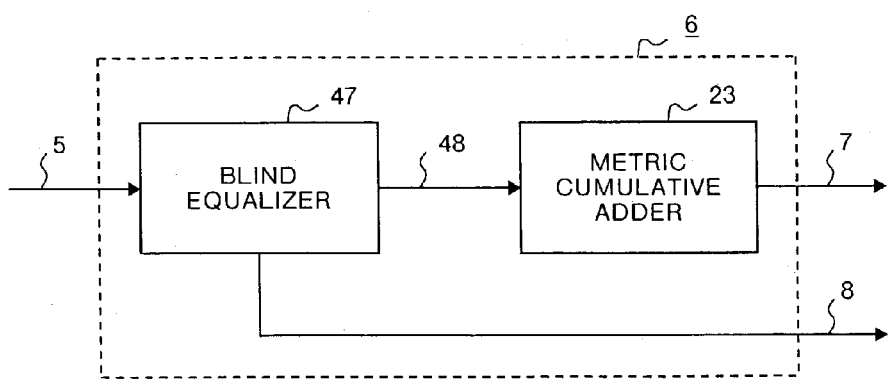
FIG. 5 is a block diagram of a demodulator having reliability information that employs an adaptive equalizer according to the first embodiment of the present invention.

FIG. 5 is a block diagram of the demodulator 6 with reliability information that employs an adaptive equalizer. In FIG. 5, 47 denotes a blind equalizer that receives the frequency-corrected sampled signal 5, compensates for a wave distortion under a multi-path transmission environment, and outputs a hard decision value 8 and a metric 48, and 23 denotes a metric cumulative adder that cumulatively adds the metric 48 and outputs reliability information 7. In FIG. 5, the blind equalizer 47 equalizes/demodulates the sampled signal 5, and outputs a hard decision value 8 and the metric 48. Unlike a general equalizer that estimates a transmission path by utilizing a training sequence, the blind equalizer 47 can simultaneously carry out both the transmission path estimation processing and the equalization/demodulation processing from usual transmission data. A detailed structure and operation of this blind equalizer 47 are disclosed in, for example, "Adaptive maximum-likelihood sequence estimation by means of combined equalization and decoding in fading environments", Kubo, et al., IEEE JSAC, pp. 102–109, 1995. Further, the blind equalizer 47 outputs a minimum path metric obtained by Viterbi algorithm as the metric 48, and the metric cumulative adder 23 cumulatively adds the metric 48 and outputs the result as the reliability information 7.

In the first embodiment, while the frequency correction value $\Delta\phi_i$ of each demodulation processor 20 has been calculated based on the maximum value $\Delta\omega_{max}$ of the frequency error to be estimated according to the expression 9, the calculating method of each frequency correction value $\Delta\phi_i$ is not limited to the method shown in the expression 9. For example, when the temperature-frequency error characteristic relating to a VCO mounted on the receiver is known in advance and also when it is possible to make a rough estimate of the frequency error of the received signal 1, a plurality of frequency correction values $\Delta\phi_i$ may be disposed closely in the vicinity of the estimated frequency error, thereby to increase the estimate precision of frequency errors.

Second Embodiment

In the first embodiment, each demodulation processor fixedly uses the frequency correction value $\Delta\phi_i$ that is determined based on the maximum value $\Delta\omega_{max}$ of the frequency error to be estimated that has been set in advance. On the other hand, in a second embodiment, it is decided whether the receiver is in a synchronization established state, and the frequency correction value $\Delta\phi_i$ of each demodulation processor is changed to another one based on a result of the decision.

The second embodiment is different from the first embodiment only in that the synchronization established state is detected and the frequency correction value $\Delta\phi_i$ of each demodulation processor is changed to another one based on a result of the decision. The other sections of the structure are exactly the same. Therefore, only the processing for detecting the synchronization established state and the processing for selecting a frequency correction value $\Delta\phi_i$ will be explained. The same sections will be assigned with identical symbols, and their explanation will be omitted.

Figure 6:
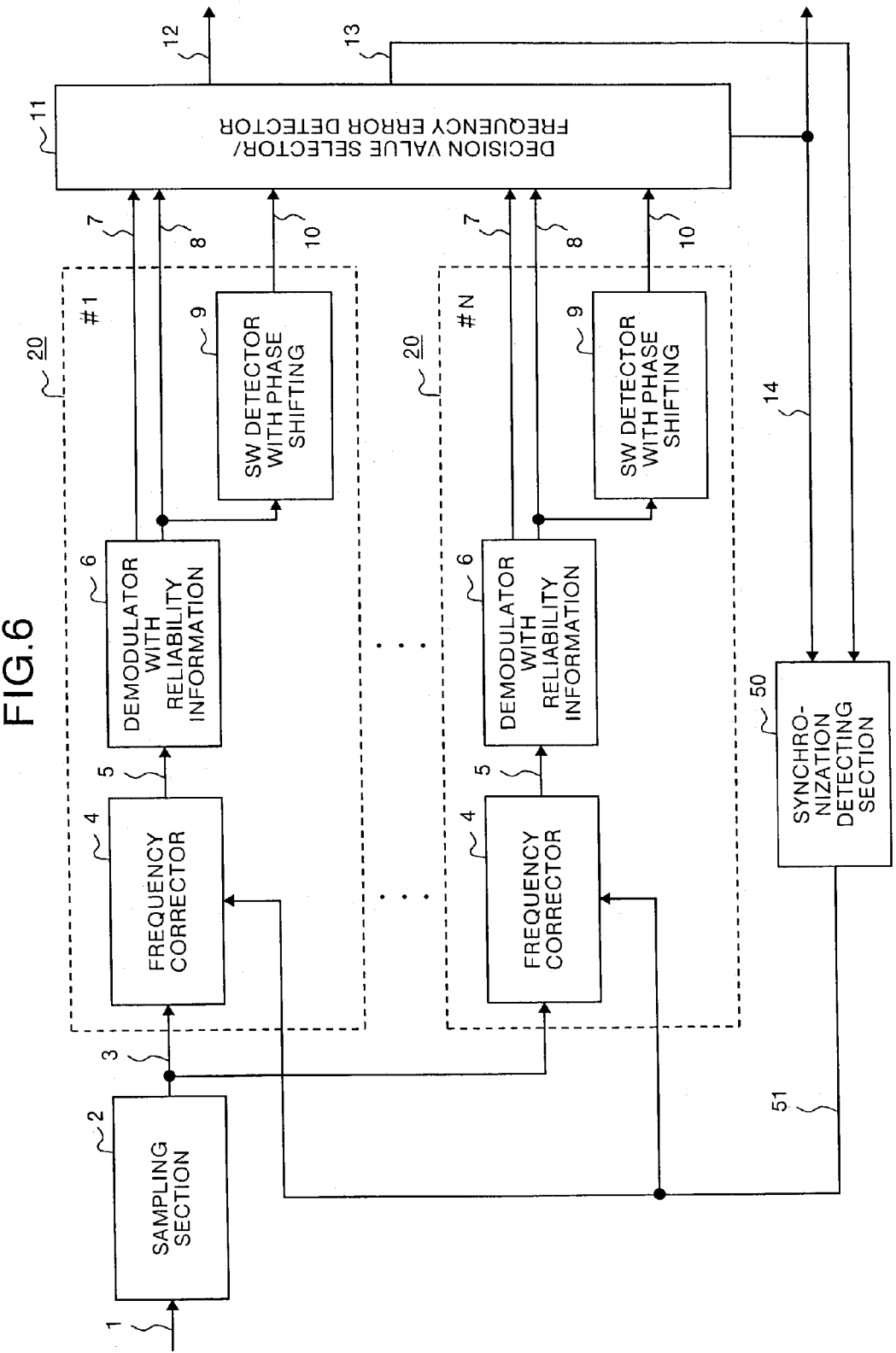
FIG. 6 is a block diagram of a receiver according to a second embodiment of the present invention.

FIG. 6 is a block diagram of a receiver according to the second embodiment. In FIG. 6, 50 denotes a synchronization detector that receives the synchronization word detection result 13 and the frequency error detection value 14, detects a synchronous state of the receiver, and outputs a frequency correction value 51 ($=\Delta\phi_i$).

First, when the receiver is not carrying out a demodulation processing of the received signal 1 but is in an asynchronous state, a frequency correction value $\Delta\phi_i$ determined in advance according to the expression 9 based on a maximum value $\Delta\omega_{max}$ of the frequency error to be estimated is set to the frequency corrector 4 of each demodulation processor 20. When the receiver starts demodulation processing, each demodulation processor 20 corrects the frequency of the sampled signal 3 with the frequency correction value $\Delta\phi_i$, and demodulates the sampled signal. The decision value selector/frequency error detector 11 outputs the final decision value 12, the synchronization word detection result 13, and the estimate frequency error 14. The maximum value $\Delta\omega_{max}$ of the frequency error to be estimated in the asynchronous state will hereinafter be called a "maximum frequency error during asynchronization".

The estimate frequency error 14 calculated by the decision value selector/frequency error detector 11 is estimated in higher precision when a difference between an actual frequency error $\Delta\omega T$ and the frequency correction value $\Delta\phi_i$ of the demodulation processor 20 is smaller. In general, an expected value of the difference between the frequency error $\Delta\omega T$ and the frequency correction value $\Delta\phi_i$ depends on a frequency interval between frequency correction values $\Delta\phi_i$. The frequency interval is determined based on the maximum frequency error $\Delta\omega_{max}$ during asynchronization according to the expression 9, for example. In other words, it is possible to increase the estimate precision of the estimate frequency error 14, by making small the maximum frequency error $\Delta\omega_{max}$ during asynchronization.

On the other hand, when the receiver is in the asynchronous state, it is not possible to estimate the frequency error $\Delta\omega T$ of a local oscillator with respect to the received signal 1. Therefore, it is necessary to estimate a wide range of frequency errors, and a small value cannot be set to the maximum frequency error $\Delta\omega_{max}$ during asynchronization.

Therefore, in the second embodiment, a maximum value $\Delta\omega_{conn}$ of a frequency error during the synchronous state is stored in a synchronization detector 50 in advance, separately from the maximum frequency error $\Delta\omega_{max}$ during asynchronization. When the receiver is in the synchronization established state, the maximum value of the frequency error to be estimated is changed to $\Delta\omega_{conn}$ to estimate the frequency error. The maximum value $\Delta\omega_{conn}$ of the frequency error in the synchronous state will hereinafter be called a "maximum frequency error during synchronization". In order to increase the estimate precision of the estimate frequency error 14 in the synchronization established state, the maximum frequency error $\Delta\omega_{conn}$ during synchronization is set to a smaller value than the maximum frequency error $\Delta\omega_{max}$ during asynchronization.

When the receiver starts the demodulation processing, the synchronization detector 50 receives the synchronization word detection result 13 and the estimate frequency error 14 from the decision value selector/frequency error detector 11, and counts the number of frames in which synchronization words have been detected continuously. In the mean time, the synchronization detector 50 stores in advance a number j of frames in which synchronization words are detected continuously to detect synchronization establishment of the receiver, and a number k of frames in which synchronization words are not detected continuously to detect an asynchronous state.

When the continuous count number of synchronization detected frames become larger than the number j of frames in which synchronization words are detected continuously, it is decided that the receiver has established the synchronous state. Then, a frequency correction value $\Delta\phi_{conn\_i}$ of each demodulation processor 20 is calculated according to the following expression 13 based on the maximum frequency error $\Delta\omega_{conn}$ during synchronization and the estimate frequency error 14.

$$\Delta\phi_{conn\_i} = \Delta\omega e \cdot T - \Delta\omega_{conn} + \frac{2\Delta\omega_{conn}}{N} \times (i-1) \qquad (13)$$

where $\Delta\omega e$ represents the estimate frequency error 14, and i represents a number (i=1, 2, ..., N) that specifies a demodulation processor.

The calculated frequency correction value 51 ($=\Delta\phi_{conn\_i}$) is set in the frequency corrector 4 of each demodulation processor 20. Thereafter, while the receiver maintains the synchronization established state, each demodulation processor 20 carries out frequency correction and demodulation processing based on the frequency correction value 51 after the updating. The decision value selector/frequency error detector 11 outputs the final decision value 12 and the estimate frequency error 14. The estimate frequency error 14 is used to control a local oscillator of the receiver like the VCO (Voltage Controlled Oscillator).

When the receiver cannot detect a synchronization word due to disconnection of communications or the like, the synchronization detector 50 counts the number of frames in which the synchronization words have not been detected continuously based on the synchronization word detection result 13. As a result, when the continuous count number of frames in which synchronization words have not been detected has become larger than the number k of frames in which synchronization words have not been detected continuously, it is decided that the receiver has shifted to the asynchronous state, and the frequency correction value $\Delta\phi_i$ is calculated according to the above expression 9, and the value is set in each demodulation processor 20.

As explained above, according to the second embodiment, synchronous/asynchronous state of the receiver is decided. In the asynchronous state, it is possible to estimate a wide range of frequency error based on the maximum frequency error $\Delta\omega_{max}$ during asynchronization. On the other hand, when synchronization has been established, it is possible to estimate with high precision a frequency error based on the maximum frequency error $\Delta\omega_{conn}$ during synchronization.

In the second embodiment, as a result of controlling the VCO (Voltage Controlled Oscillator) based on the estimate frequency error 14 (=$\Delta\omega$e), when the number of counting the detection of the synchronization words by the synchronization detector 50 is larger than the number j of frames where synchronization words are detected continuously and also when the estimate frequency error 14 has become sufficiently small to the extent that it can be disregarded as compared with the maximum frequency error $\Delta\omega_{conn}$ during synchronization, the embodiment may be configured to decide that the local oscillator of the receiver does not need to be adjusted and stop the control of the VCO. In this instance, the estimate frequency error 14 (=$\Delta\omega$e) is set to zero in the calculation processing of the frequency correction value $\Delta\phi_{conn\_i}$ of each demodulation processor 20 that is shown in the expression 13.

Third Embodiment

In the second embodiment, a plurality of demodulation processors are provided. The frequency correctors carry out frequency correction processing of a sampled signal with correction values $\Delta\phi_i$ that are different from each other, and the demodulators with reliability information carry out demodulation processing in parallel. On the other hand, in a third embodiment, one demodulation processor is provided. After a sampled signal is once stored, frequency correction processing and demodulation processing are repeatedly carried out by a plurality of times while frequency correction values $\Delta\phi_i$ are sequentially changed to one another.

The third embodiment is different from the second embodiment only in that one demodulation processor is provided, and that frequency correction processing and demodulation processing are repeatedly carried out by a plurality of times while frequency correction values $\Delta\phi_i$ are sequentially changed to one another. The other sections of the structure are exactly the same. Therefore, only the frequency correction processing and the demodulation processing of the demodulation processor will be explained. The other sections of the structure will be assigned with identical symbols, and their explanation will be omitted.

Figure 7:
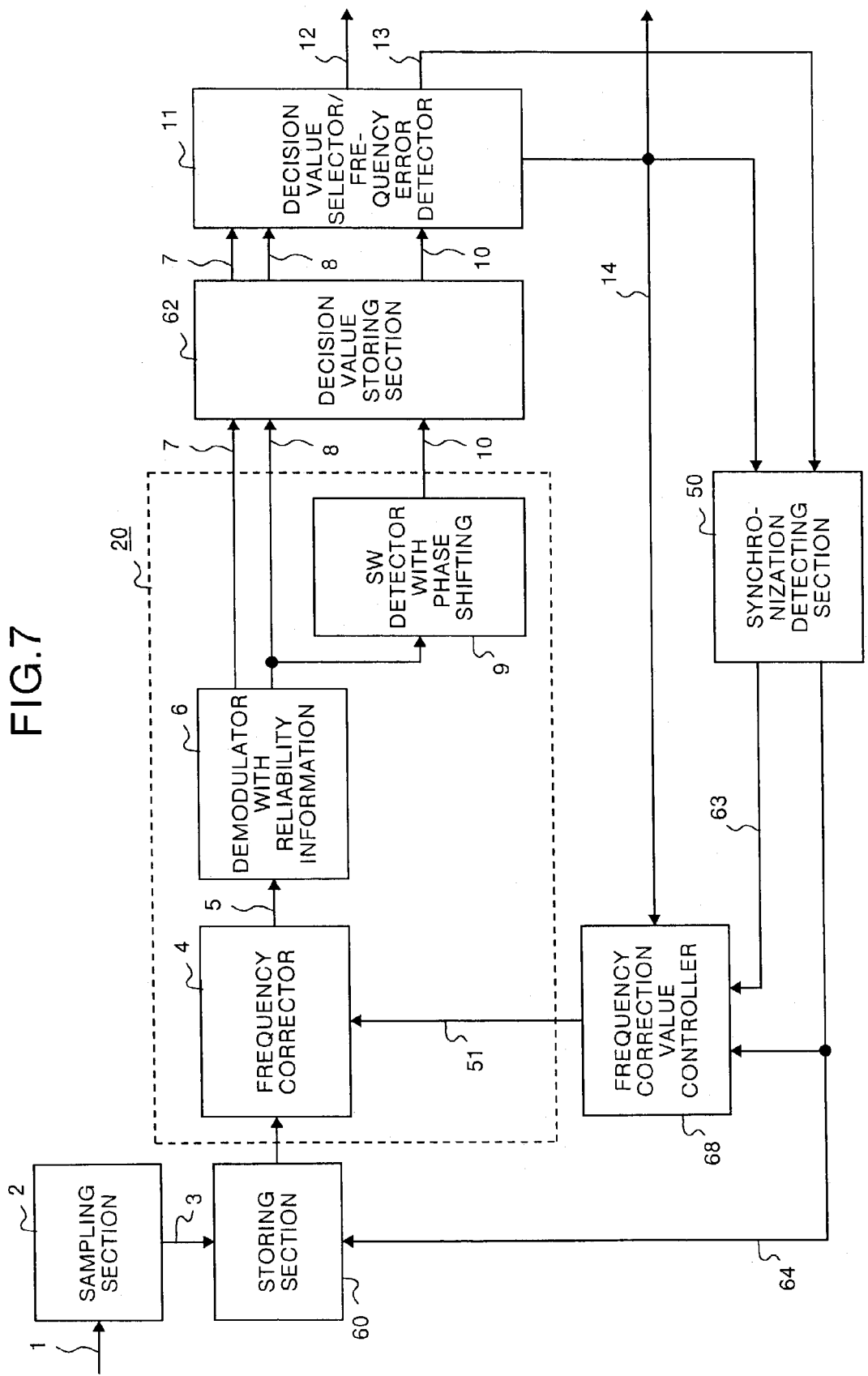
FIG. 7 is a block diagram of a receiver according to a third embodiment of the present invention.

FIG. 7 is a block diagram of a receiver according to the third embodiment. In FIG. 7, 60 denotes a storing section that once stores the sampled signal 3 that is output from the sampling section 2, 62 denotes a decision value storing section that stores the reliability information 7, hard decision value 8, and the synchronization word detection result 10 that are output from the demodulation processor 20, 63 denotes a result of deciding a synchronous state that is output from the synchronization word detector 50, 64 denotes a synchronization word detection timing signal, and 68 denotes a frequency correction value controller (or a demodulation control unit) that controls selection of a frequency correction value 51 that is set in the frequency corrector 4.

The operation of a receiver according to the third embodiment that has the above structure will be explained below. First, the synchronization detector 50 generates the synchronization word detection timing signal 64 based on the synchronization word detection result 13 that is output from the decision value selector/frequency error detector 11. When the receiver is in the asynchronous state, the synchronization detector 50 sets one frame time $T_f$ of the received signal as one period, and generates the synchronization detection timing signal at an own timing.

The storing section 60 sequentially stores sampled signals 3 of one frame component as one unit based on the synchronization word detection timing signal 64.

The demodulation processor 20 reads the sampled signals for one frame component from the storing section 60, and repeatedly carries out the frequency correction processing and the demodulation processing by a pre-set number N of times of the demodulation processing, while the frequency correction values $\Delta\phi_i$ are sequentially changed to one another. The demodulation processing that is repeatedly executed by the demodulation processor 20 and the frequency correction value controller 68 will be explained below.

First, the frequency correction value controller 68 stores in advance the maximum frequency error $\Delta\omega_{max}$ during asynchronization and the maximum frequency error $\Delta\omega_{conn}$ during synchronization. The frequency correction value controller 68 catches a synchronous state of the receiver based on the result of deciding the synchronous state 63 that is input from the synchronization detector 50. When the receiver is in the asynchronous state, the frequency correction value controller 68 generates N frequency correction values $\Delta\phi_i$ in total according to the above expression 9 based on the maximum frequency error $\Delta\omega_{max}$ during asynchronization. On the other hand, when the receiver is in the synchronous state, the frequency correction value controller 68 generates N frequency correction values $\Delta\phi_{conn\_i}$ in total according to the above expression 13 based on the maximum frequency error $\Delta\omega_{conn}$ during synchronization and the estimate frequency error 14. One corresponding frequency correction value 51 is set in the frequency corrector 4 out of the calculated N frequency correction values $\Delta\phi_i$ (or $\Delta\phi_{conn\_i}$).

When the synchronization word detection timing signal 64 is input, the frequency corrector 4 reads the sampled signals for one frame that are stored in the storing section 60, and corrects the frequency of the sampled signals with the frequency correction value 51. Next, the demodulator 6 with reliability information and the SW detector 9 with phase shifting generate the reliability information 7, the hard decision value 8, and the synchronization word detection result 10 from the frequency-corrected sampled signals 5. The reliability information 7, the hard decision value 8, and the synchronization word detection result 10 that have been generated relating to one frequency correction value 51 are once stored in the decision value storing section 62.

The frequency correction value controller 68 sequentially selects the N frequency correction values $\Delta\phi_i$ (or $\Delta\phi_{conn\_i}$) in total prepared in advance. The demodulation processor 20 repeatedly executes N times in total the frequency correction processing and the demodulation processing relating to the sampled signals for one frame stored in the storing section 60. As a result, the reliability information 7, the hard decision value 8, and the synchronization word detection result 10 that correspond to each of the total N frequency correction values 51 are sequentially stored in the decision value storing section 62. The demodulation processor 20 operates at a high processing speed sufficiently to complete the demodulation processing of total N times relating to the sampled signals for one frame within a shorter time than one frame time $T_f$.

The decision value selector/frequency error detector 11 outputs a final decision value 12, a synchronization word detection result 13, and an estimate frequency error 14 corresponding to the final decision value based on the reliability information 7, the hard decision value 8, and the synchronization word detection result 10 that correspond to each of the total N frequency correction values $\Delta\phi_i$ (or $\Delta\phi_{conn\_i}$) that are stored in the decision value storing unit.

In the third embodiment, the storing section 60 needs to carry out in parallel the write processing of sequentially storing the sampled signals 3 in one frame unit and the processing of repeatedly reading the sampled signals 3 by N times in total during one frame time $T_f$. These processing are realized by applying a memory device generally called a dual port RAM that can execute the write processing and the read processing in parallel, as the storing section 60.

As explained above, according to the third embodiment, after the sampled signals for one frame are once stored in the storing section 60, the frequency correction values are demodulated repeatedly by a plurality of times while the frequency correction values are sequentially changed to one another. Based on a plurality of pieces of the reliability information 7 and the synchronization detection result 10 that are obtained as a result of the demodulation, one final decision value 12 is specified from among a plurality of the hard decision values 8, and the estimate frequency error 14 of the received signal is detected. Therefore, it is possible to accurately estimate the frequency error of the received signal within a predetermined estimate range of frequency errors. Further, as the estimate frequency error 14 is detected using only a known synchronization word that has been inserted into the received signal, it is not necessary to insert a specific pattern for estimating a frequency error into the transmission data. Consequently, it is possible to correct the frequency error without lowering the data transmission efficiency.

Further, according to the third embodiment, one demodulation processor 20 repeatedly executes the frequency correction processing and the demodulation processing by a plurality of times while a plurality of frequency correction values $\Delta\phi_i$ are sequentially changed to one another. Therefore, it is possible to substantially reduce the circuit scale required for detecting the estimate frequency error 14.

Fourth Embodiment

In the second embodiment, the sampling section 2 samples the received signal 1 at a symbol rate, and the demodulation processors 20 carry out the frequency correction and the demodulation processing of one and the same sampled signal 3 with mutually separate frequency correction values $\Delta\phi_i$. On the other hand, in a fourth embodiment, the sampling section 2 over-samples a received signal at a sampling period $T_s$ instead of the symbol period T, and a plurality of demodulation processors carry out the frequency correction and the demodulation processing of sampled signals relating to respective sampling timings, and detect an estimate frequency error 14.

The fourth embodiment is different from the second embodiment only in that the received signal is over-sampled, and that a plurality of demodulation processors carry out the frequency correction and the demodulation processing of the sampled signals relating to respective sampling timings. The other sections of the structure are exactly the same. Therefore, only over-sampling processing of the received signal, distribution processing of the sampled signal, and demodulation processing of each sampled signal will be explained below. The same sections of the structure will be assigned with identical symbols, and their explanation will be omitted.

Figure 8:
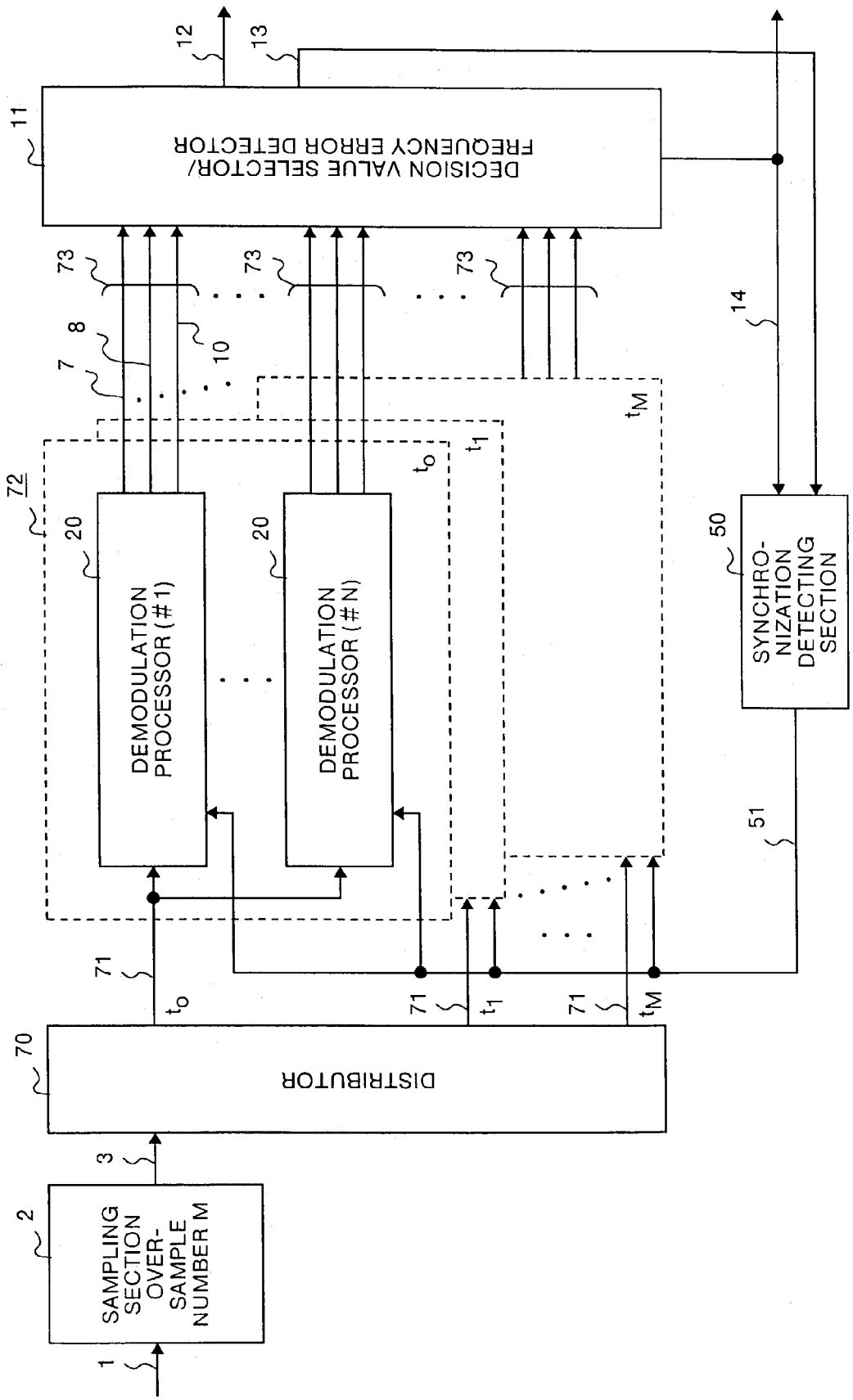
FIG. 8 is a block diagram of a receiver according to a fourth embodiment of the present invention.

FIG. 8 is a block diagram of a receiver according to the fourth embodiment. In FIG. 8, 70 denotes a distributor that distributes the sampled signals 3 that have been sampled by the sampling section 2 in an over-sampling number M, and outputs M distributed signals 71 in total, 72 denotes a distributed signal processor in which N demodulation processors 20 with mutually different frequency correction values $\Delta\phi_i$ demodulate one distributed signal 71, and 73 denotes demodulation processed data consisting of the reliability information 7, the hard decision value 8, and the synchronization word detection result 10 that are output from each demodulation processor 20. A receiver according to the fourth embodiment has M distributed signal processors 72 in total corresponding to the respective distributed signals 71 that are output from the distributor 70, and has M×N demodulation processors 20 in total for the receiver. While only one distributed signal processor 72 (sampling timing $t_0$) is shown in FIG. 8 for the sake of simplicity, all the M distributed signal processors 72 have the same structure. The structure of each demodulation processor 20 is the same as the structure shown in FIG. 6.

Figure 9:
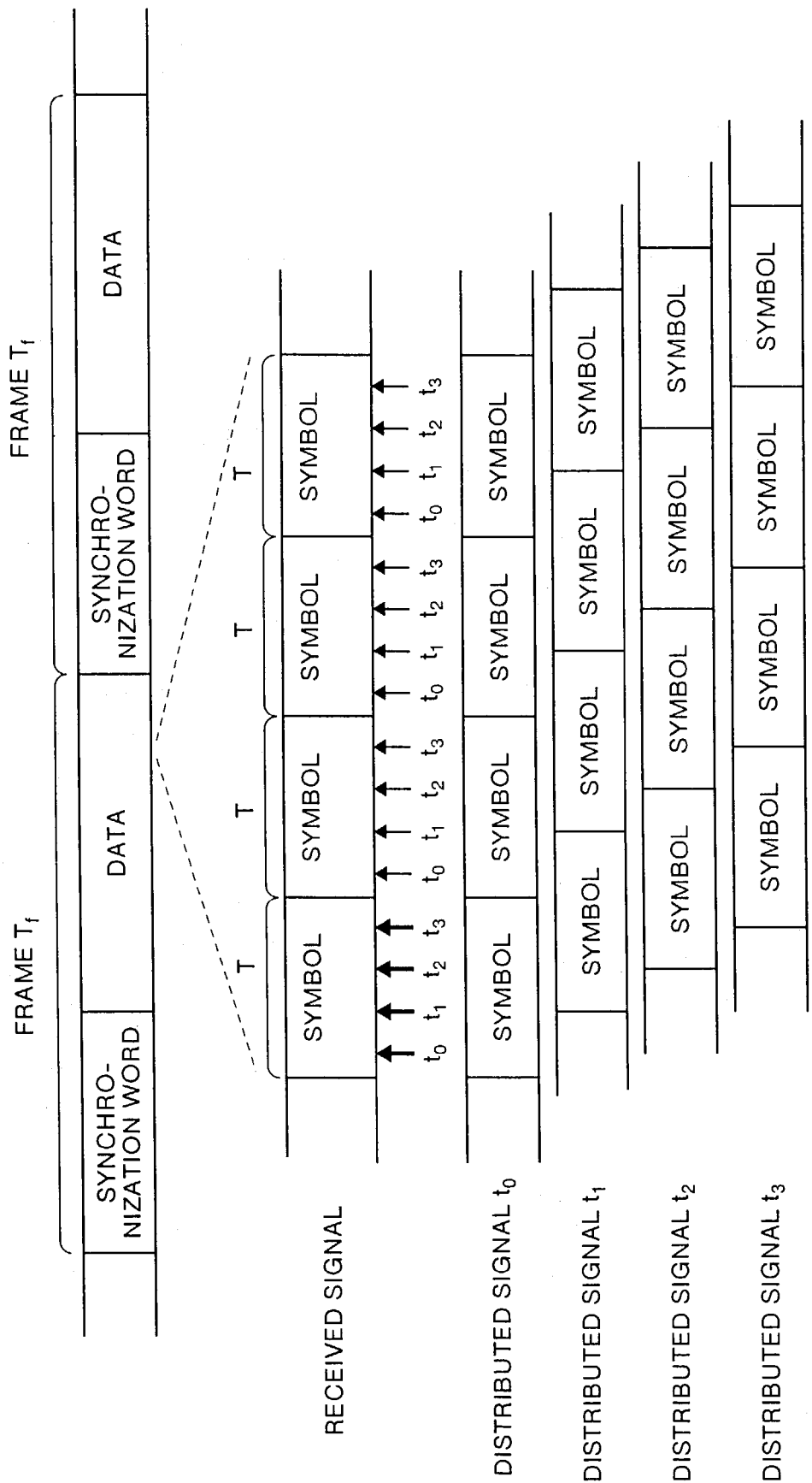
FIG. 9 is an explanatory diagram of an over-sampling processing according to the fourth embodiment of the present invention.
Figure 10:
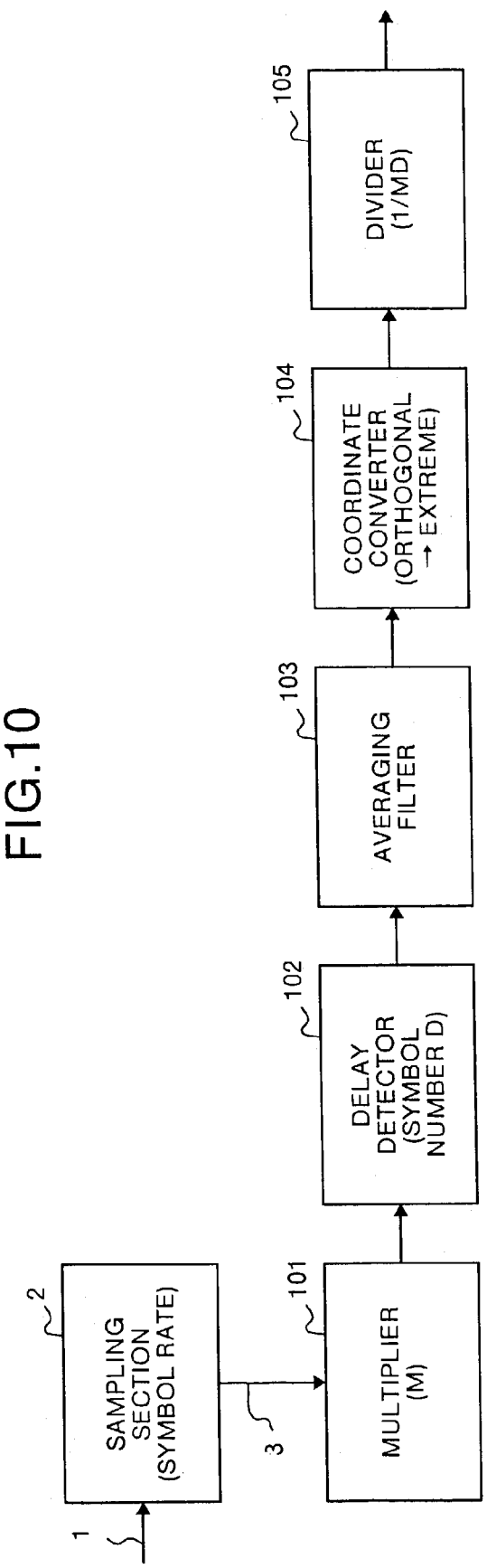
FIG. 10 is a block diagram of the conventional frequency error estimating circuit.

The operation of the receiver according to the fourth embodiment that has the above structure will be explained below. First, the sampling section 2 samples the received signal 1 in the over-sampling number M, and outputs the sampled signal 3. The over-sampling processing of the sampling section 2 will be explained below with reference to FIG. 9. FIG. 9 shows the over-sampling processing of 5 the received signal 1 when the over-sampling number is set to M=4. While the received signal 1 is modulated in the symbol period T, the sampling section 2 samples the received signal at four sampling points of $t_0$ to $t_3$ per one symbol period T.

The distributor 70 sequentially distributes the sampled signals 3 that have been over-sampled M times, for each sampling point, and generates M distributed signals in total. In the example shown in FIG. 9, the four-time over-sampled signals are distributed, and four distributed signals relating to the sampling points of $t_0$ to $t_3$ are generated, respectively. Each distributed signal 71 becomes equivalent to a signal obtained by sampling the received signal 1 at the symbol rate.

The N demodulation processors 20 of the distributed signal processors 72 have been set with mutually different frequency correction values 51 (=$\Delta\phi_i$) by the synchronization detector 50. The synchronization detector 50 selects any of the frequency correction values 51 in each demodulation processor according to whether the receiver is in the synchronous state.

Each distributed signal processor 72 inputs the corresponding distributed signal 71 to the N demodulation processors 20 respectively. Each demodulation processor 20 corrects the frequency error based on the frequency correction value 51, demodulates the distributed signal, and outputs demodulation processed data 73 consisting of the reliability information 7, the hard decision value 8, and the synchronization word detection result 10. As a result, one distributed signal processor 72 outputs N pieces of demodulation processed data 73.

The decision value selector/frequency error detector 11 carries out a selection of a final decision value 12 and a detection of an estimate error 14 according to the method shown in the first embodiment, based on the M×N pieces of demodulation processed data 73 that have been output from each distributed signal processor 72.

As explained above, according to the fourth embodiment, the received signal 1 is over-sampled to generate a plurality of distributed signals 71. The distributed signals are frequency-corrected and demodulated separately, thereby to estimate frequency errors. Therefore, by increasing the total number of the demodulation processed data 73 whose frequency error is to be detected, it is possible to increase the estimate precision of the frequency errors.

In the fourth embodiment, each distributed signal processor 72 has N demodulation processors 20 respectively so as to carry out the frequency correction processing and the demodulation processing of the distributed signals 71 in parallel. However, the structure is not limited to this structure. For example, as shown in the third embodiment, one demodulation processor 20 and the storing section that stores distributed signals may be provided. The distributed signals stored in the storing section may be frequency-corrected and demodulated repeatedly by a plurality of times while the frequency correction values $\Delta\phi_i$ are changed to one another.

While the decision value selector/frequency error detector 11 calculates the final decision value 12 and the estimate frequency error 14 based on the M×N pieces in total of demodulation processed data 73, it is also possible to estimate a symbol timing of the received signal 1 in addition to the estimate frequency error 14, by applying the method disclosed in, for example, "Blind Demodulation Techniques by means of an Adaptive MLSE with Per-Survivor Processing", Kubo et al., TECHNICAL REPORT OF IEICE, RCS99-185, pp. 37–44, 2000.

As explained above, according to the present invention, a plurality of demodulation processors are provided. Each demodulation processor carries out a frequency correction of the sampled signal based on the frequency correction value that is different from others, and carries out each separate demodulation processing. The frequency error of the received signal is estimated based on the frequency correction value of the demodulation processor corresponding to the final decision value of highest reliability, among a plurality of decision values obtained as a result of demodulation. Therefore, there is an effect that it is possible to accurately estimate a frequency error within a predetermined estimate range of frequency errors that are prescribed by the frequency correction value of each demodulation processor.

As the frequency error is estimated by using only a known synchronization word that has been inserted into the received signal, it is not necessary to insert a specific pattern to estimate the frequency error into the transmission data. It is therefore possible to correct the frequency error without lowering the data transmission efficiency. Thus, there is an effect that it is possible to accurately estimate the frequency error, even when the frequency error varies during communications in the mobile communication system or the like.

According to the next invention, the received signal is over-sampled to generate a plurality of distributed signals. The distributed signals are frequency-corrected and demodulated separately by a plurality of demodulation processors, thereby to estimate frequency errors. Therefore, there is an effect that by increasing the total number of data whose frequency error is to be detected, it is possible to increase the estimate precision of frequency errors.

According to the next invention, the frequency correction processing and the demodulation processing relating to each of a plurality of mutually different frequency correction values are repeatedly executed by a plurality of times while the frequency correction values are sequentially changed to one another. Therefore, there is an effect that it is possible to substantially reduce the circuit scale required to estimate a frequency error.

According to the next invention, a synchronization word detection processing for a decision value is carried out based on a plurality of known patterns that are obtained by phase-shifting a known synchronization word pattern according to a plurality of different phase-shift quantities. At the same time, the estimate frequency error is corrected based on the phase-shift quantity of a known pattern in which a synchronization word has been detected. Therefore, there is an effect that it is possible to improve the estimate precision of frequency errors.

According to the next invention, the synchronization detecting unit that decides a synchronous/asynchronous state of the receiver is provided. A frequency corrector of the demodulation processing unit selects any of the frequency correction values based on the result of the decision made on the synchronous state. Therefore, there is an effect that it is possible to change the degree of estimate precision of frequency error to any degree according to the synchronous state of the receiver.

INDUSTRIAL APPLICABILITY

As explained above, the receiver that estimates the frequency error and the method of estimating the frequency error according to the present invention are suitable for satellite communications and mobile communications.

What is claimed is:

1. A receiver comprising:
   a sampling unit that sequentially samples a received signal modulated using a predetermined system;
   a plurality of demodulation processing units that have frequency correction values of mutually different sizes set in advance, and that correct frequencies of the sampled signals according to the frequency correction values, discretely demodulate the sampled signals after the frequency correction, output decision values and reliability information of the received signal, and detect each known synchronization word inserted into the received signal from the decision values;
   a decision value selecting unit that selects one final decision value from a plurality of decision values based on a plurality of pieces of reliability information and results of the detection of the synchronization words that have been output from the demodulation processing units; and a frequency error detecting unit that estimates a frequency error of the received signal based on a frequency correction value of the demodulation processing unit corresponding to the final decision value, wherein the demodulation processing unit carries out detection processing of a synchronization word corresponding to a decision value based on a plurality of known patterns obtained by phase-shifting a known synchronization pattern with a plurality of different phase shift quantities respectively, and specifies a phase shift quantity of a known pattern in which the synchronization word has been detected, and the frequency error detecting unit corrects the frequency correction value corresponding to the final decision value that has been selected by the decision value selecting unit, with the specified phase shift quantity, and estimates a frequency error of the received signal.

2. The receiver according to claim 1, wherein the sampling unit over-samples the received signal for each symbol at a plurality of sampling timings and sequentially outputs sampled signals, and the receiver further comprises a distributing unit that sequentially distributes the sampled signals at the sampling timings, and outputs a plurality of distributed signals, wherein the distributed signals are demodulated by the plurality of demodulation processing units that have the frequency correction values of mutually different sizes.

3. The receiver according to claim 1, further comprising:

a synchronization detecting unit that decides whether the receiver is in a synchronous state, based on a result of the detection of the synchronization word corresponding to the final decision value, wherein the demodulation processing unit selects any of the frequency correction values according to whether the receiver is in the synchronous state.

4. A receiver comprising:

a sampling unit that sequentially samples a received signal modulated using a predetermined system;

a storing unit that sequentially stores the sampled signals over a predetermined period of time;

a demodulation processing unit that sequentially corrects frequencies of the sampled signals stored in the storing unit according to a predetermined frequency correction value, demodulates the sampled signals after the frequency correction, outputs decision values and reliability information of the sampled signals, and detects a known synchronization word that has been inserted into the received signal, from the decision values;

a demodulation control unit that makes the demodulation processing unit demodulate the sampled signals in the storing unit repeatedly by a plurality of times, while the frequency correction values obtained in the demodulation processing unit are changed to one another;

a decision value storing unit that stores a decision value, reliability information, and a result of the detection of the synchronization word relating to each of the frequency correction values, respectively;

a decision value selecting unit that selects one final decision value from the plurality of decision values based on a plurality of pieces of reliability information and results of the detection of the synchronization words that have been stored in the decision value storing unit; and a frequency error detecting unit that estimates a frequency error of the received signal based on a frequency correction value corresponding to the final decision value, wherein the demodulation processing unit carries out detection processing of a synchronization word corresponding to a decision value based on a plurality of known patterns obtained by phase-shifting a known synchronization pattern with a plurality of different phase shift quantities respectively, and specifies a phase shift quantity of a known pattern in which the synchronization word has been detected, and the frequency error detecting unit corrects the frequency correction value corresponding to the final decision value that has been selected by the decision value selecting unit, with the specified phase shift quantity, and estimates a frequency error of the received signal.

5. The receiver according to claim 4, further comprising:

a synchronization detecting unit that decides whether the receiver is in a synchronous state, based on the result of the detection of the synchronization word corresponding to the final decision value, wherein the demodulation processing unit selects any of the frequency correction values according to whether the receiver is in the synchronous state.

6. A frequency error estimating method comprising:

a sampling step of sequentially sampling a received signal modulated using a predetermined system;

a plurality of demodulation processing steps of setting in advance frequency correction values of mutually different sizes, correcting frequencies of the sampled signals according to the frequency correction values, discretely demodulating the sampled signals after the frequency correction, outputting decision values and reliability information of the received signal, and detecting known synchronization words that have been inserted into the received signal, from the decision value;

a decision value selecting step of selecting one final decision value from a plurality of decision values based on a plurality of pieces of reliability information and results of the detection of the synchronization word output at the demodulation processing steps; and a frequency error detecting step of estimating a frequency error of the received signal based on a frequency correction value at the demodulation processing step corresponding to the final decision value, wherein each of the demodulation processing steps includes carrying out detection processing of a synchronization word corresponding to a decision value based on a plurality of known patterns obtained by phase-shifting a known synchronization pattern with a plurality of different phase shift quantities respectively, and specifying a phase shift quantity of a known pattern in which the synchronization word has been detected, and the frequency error detecting step comprises correcting the frequency correction value corresponding to the final decision value selected at the decision value selecting step, with the specified phase shift quantity, and estimating a frequency error of the received signal.

7. The frequency error estimating method according to claim 6, wherein the sampling step includes over-sampling the received signal for each symbol at a plurality of sampling timings and sequentially outputting sampled signals, and the method further comprising a distributing step of sequentially distributing the sampled signals at the sampling timings, and outputting a plurality of distributed signals, wherein the distributed signals are demodulated at the plurality of demodulation processing steps in which the frequency correction values of mutually different sizes are used.

8. The frequency error estimating method according to claim 6, further comprising:

a synchronization detecting step of deciding whether the receiver is in a synchronous state, based on a result of the detection of a synchronization word corresponding to the final decision value, wherein the demodulation processing step includes selecting any of the frequency correction values according to whether the receiver is in the synchronous state.

9. A frequency error estimating method comprising:

a sampling step of sequentially sampling a received signal modulated using a predetermined system;

a storing step of sequentially storing the sampled signals over a predetermined period of time;

a demodulation processing step of correcting frequencies of the sampled signals stored at the storing step by a predetermined frequency correction value, demodulating the sampled signal after the frequency correction, outputting a decision value and reliability information of the sampled signal, and detecting a known synchronization word that has been inserted into the received signal, from the decision value;

a demodulation control step of controlling so as to execute processing in the demodulation processing step repeatedly by a plurality of times, while the frequency correction values are changed to one another;

a decision value storing step of storing a decision value, reliability information, and a result of the detection of the synchronization word relating to each of the frequency correction values, respectively;

a decision value selecting step of selecting one final decision value from a plurality of decision values based on a plurality of pieces of reliability information and a result of the detection of the synchronization word that have been stored at the decision value storing step; and a frequency error detecting step of estimating a frequency error of the received signal based on a frequency correction value corresponding to the final decision value, wherein the demodulation processing steps includes carrying out a detection processing of a synchronization word corresponding to a decision value based on a plurality of known patterns obtained by phase-shifting a known synchronization pattern with a plurality of different phase shift quantities respectively, and specifying a phase shift quantity of a known pattern in which the synchronization word has been detected, and the frequency error detecting step includes correcting the frequency correction value corresponding to the final decision value selected at the decision value selecting step, with the specified phase shift quantity, and estimating a frequency error of the received signal.

10. The frequency error estimating method according to claim 9, further comprising:

a synchronization detecting step of deciding whether the receiver is in a synchronous state, based on a result of the detection of a synchronization word corresponding to the final decision value, wherein the demodulation processing step includes selecting any of the frequency correction values according to whether the receiver is in the synchronous state.

* * * * *